(12) United States Patent
Hsu et al.

(10) Patent No.: US 7,692,742 B2
(45) Date of Patent: Apr. 6, 2010

(54) TRANSFLECTIVE LIQUID CRYSTAL DISPLAY

(75) Inventors: Jy Shan Hsu, Jhunan Township, Miaoli County (TW); Ping Wen Huang, Taichung (TW); Ming Wu Chen, Jhushan Township, Nantou County (TW); Hao Chieh Weng, Daya Township, Taichung County (TW)

(73) Assignee: Wintek Corporation, Taichung (TW)

( * ) Notice: Subject to any disclaimer, the term of this patent is extended or adjusted under 35 U.S.C. 154(b) by 296 days.

(21) Appl. No.: 11/764,564

(22) Filed: Jun. 18, 2007

(65) Prior Publication Data
US 2007/0291205 A1 Dec. 20, 2007

(30) Foreign Application Priority Data
Jun. 19, 2006 (TW) .............................. 95121851 A

(51) Int. Cl.
*G02F 1/1335* (2006.01)
(52) U.S. Cl. ...................................... 349/114
(58) Field of Classification Search ............. None
See application file for complete search history.

(56) References Cited

U.S. PATENT DOCUMENTS

| 6,522,377 | B2 | 2/2003 | Kim |
| 6,801,281 | B2 | 10/2004 | Huang |
| 6,862,065 | B2 | 3/2005 | Liao |
| 6,870,585 | B2 | 3/2005 | Chen |
| 2008/0165309 | A1* | 7/2008 | Ge et al. ................... 349/85 |
| 2008/0204637 | A1* | 8/2008 | Verschueren .............. 349/114 |
| 2009/0002615 | A1* | 1/2009 | Fujii et al. ................ 349/123 |

* cited by examiner

*Primary Examiner*—Sung H Pak

(57) ABSTRACT

A transflective liquid crystal display is provided. The electric fields of reflective regions are adjusted by arranging resistors between transmissive electrodes and reflectors or by disposing reflectors floating on the transmissive electrodes and ground electrodes so that the phase shift of liquid crystal layer in the reflective region and transmissive region can be controlled. Accordingly, the transmissive area and reflective area can be kept substantially identical in thickness and the complex process for manufacturing double gap structure is thus not required.

19 Claims, 9 Drawing Sheets

TRANSFLECTIVE LIQUID CRYSTAL DISPLAY

CROSS REFERENCE TO RELATED APPLICATION

This application claims the priority benefit of Taiwan Patent Application Serial Number 095121851 filed Jun. 19, 2006, the full disclosure of which is incorporated herein by reference.

BACKGROUND OF THE INVENTION

1. Field of the Invention

This invention generally relates to a liquid crystal display, and more particularly, to a transflective liquid crystal display.

2. Description of the Related Art

Generally, a transmissive liquid crystal display (LCD) device has advantages of high contrast ratio and good color saturation. However, the transmissive LCD device may suffer low image contrast when ambient light is strong. In addition, its power consumption is high due to the need of a backlight device. On the other hand, a reflective LCD device uses ambient light, instead of backlight, for displaying images, and therefore its power consumption is relatively low. However, the reflective LCD device is less visible when ambient light is weak.

In order to overcome the above-mentioned drawbacks, a transflective LCD device is developed. The transflective LCD device can use both the back light and ambient light so that it can perform a clear display even in dark surroundings while reducing the power consumption. In general, the transflective LCD device includes two types, i.e. a single cell gap transflective LCD device and a double cell gap transflective LCD device. In the single cell gap transflective LCD device, the cell gaps for reflective and transmissive regions are the same. In the double cell gap transflective LCD device, the cell gaps for reflective and transmissive regions are different.

Referring to FIG. 1, a conventional double cell gap transflective LCD 100 includes two polarizers 132, 134 and two compensation films 122, 124 disposed between the polarizers 132, 134. Two substrates 112, 114 are disposed between the compensation films 122, 124 and a liquid crystal layer 140 with a thickness of d is sandwiched between the substrates 112, 114. A reflection plate 150 with a plurality of openings is disposed on the substrate 114. The light 160 from a backlight (not shown) passes through in sequence the substrate 114, the openings of the reflection plate 150, liquid crystal layer 140 and ultimately arrives at a viewer. In addition, the ambient light 170 passes through the substrate 112, liquid crystal layer 140 and is ultimately reflected to the viewer by the reflection plate 150. In order to make the light 160 and ambient light 170 have the same optical path length when they pass through the liquid crystal layer 140, it is necessary for the reflection plate 150 to have a thickness equal to one-half of that of the liquid crystal layer 140, i.e. d/2. However, extra facilities are required for manufacturing the reflection plate 150 in the LCD 100 and the production yield in manufacturing the same is remarkably reduced.

Referring to FIG. 2, a conventional mixed-mode twisted nematic (MTN) single cell gap transflective LCD 200 also includes a reflection plate 150' with a plurality of openings thereon. In comparison with the LCD 100, the LCD 200 is required to have a 90-degree difference in pretilt angle between the alignment layers 282 and 284 that are disposed respectively on the transmissive region and reflective region. This will need more complicated processes to make such a structure.

Referring to FIG. 3, another conventional mixed-mode twisted nematic single cell gap transflective LCD 300 has a quarter-wave retardation film 390 disposed on the reflection plate 150' in order to compensate for the optical path length. Likewise, it is also required to have extra facilities for making such a structure.

In view of the above, there exists a need to provide a transflective liquid crystal display to solve the above-mentioned problems.

SUMMARY OF THE INVENTION

It is an object of the present invention to provide a transflective liquid crystal display that the transmissive area and reflective area thereof can be substantially identical in thickness and therefore the complex process for manufacturing double cell gap structure is not required.

In the first embodiment, the transflective liquid crystal display includes an active element array substrate and a plurality of pixel areas defined on the active element array substrate. Each of the pixel areas is provided with an active element, a transmissive electrode, at least one resistor, a reflector and a ground electrode, wherein the ground electrode is electrically connected to the reflector and the transmissive electrode is electrically connected to the reflector by the resistor. A counter substrate is positioned above the active element array substrate and a common electrode is disposed on the counter substrate and faces the pixel area. A liquid crystal layer is sandwiched between the two substrates. In addition, a lower polarizer is disposed under the active element array substrate and an upper polarizer is disposed above the counter substrate.

In the second embodiment, the transflective liquid crystal display includes all the elements shown in the first embodiment except that there is no resistor disposed between the transmissive electrode and reflector. An extra isolation layer is disposed on the transmissive electrode and ground electrode. The reflector floats on the isolation layer.

The foregoing, as well as additional objects, features and advantages of the invention will be more readily apparent from the following detailed description, which proceeds with reference to the accompanying drawings.

BRIEF DESCRIPTION OF THE DRAWINGS

FIG. 4b illustrates the distribution of the pixel areas defined on the active element array substrate of the display shown in FIG. 4a.

DETAILED DESCRIPTION OF PREFERRED EMBODIMENT

Figure 1:
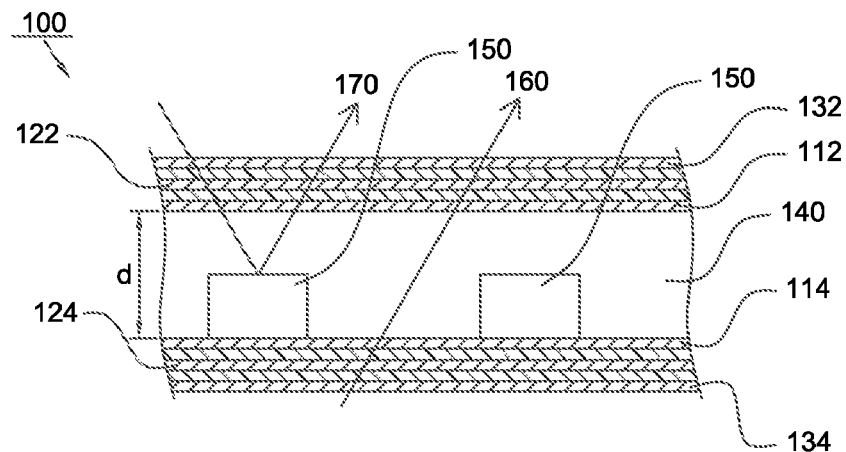
FIG. 1 is a schematic diagram illustrating a conventional double cell gap transflective liquid crystal display.
Figure 2:
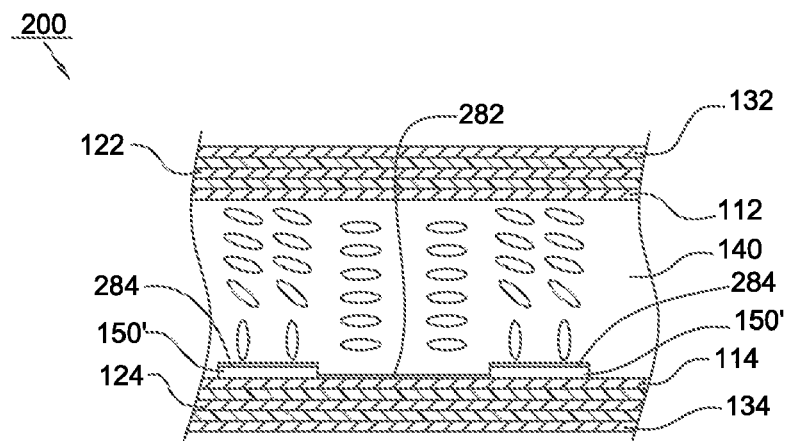
FIG. 2 is a schematic diagram illustrating a conventional mixed-mode twisted nematic single cell gap transflective liquid crystal display.
Figure 3:
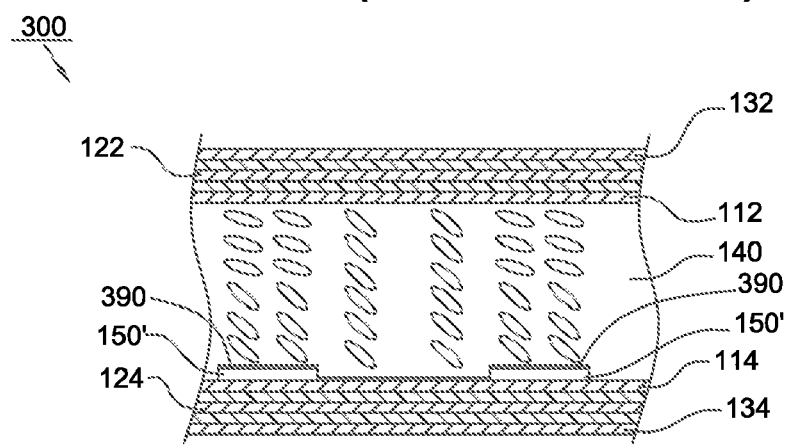
FIG. 3 is another schematic diagram illustrating a conventional mixed-mode twisted nematic single cell gap transflective liquid crystal display.
Figure 4A:
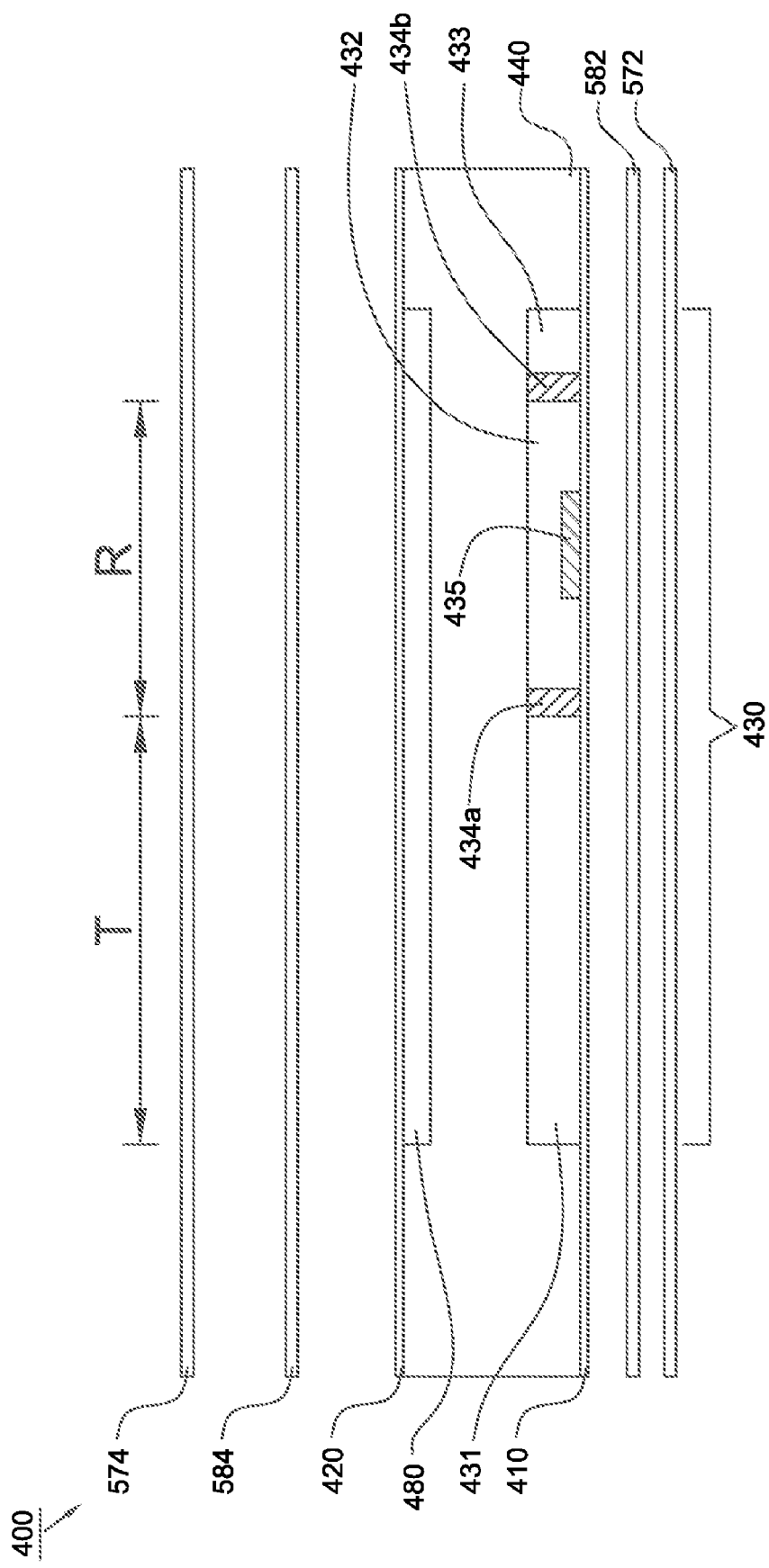
FIG. 4a is a schematic diagram illustrating a transmissive liquid crystal display according to the first embodiment of the present invention.
Figure 4B:
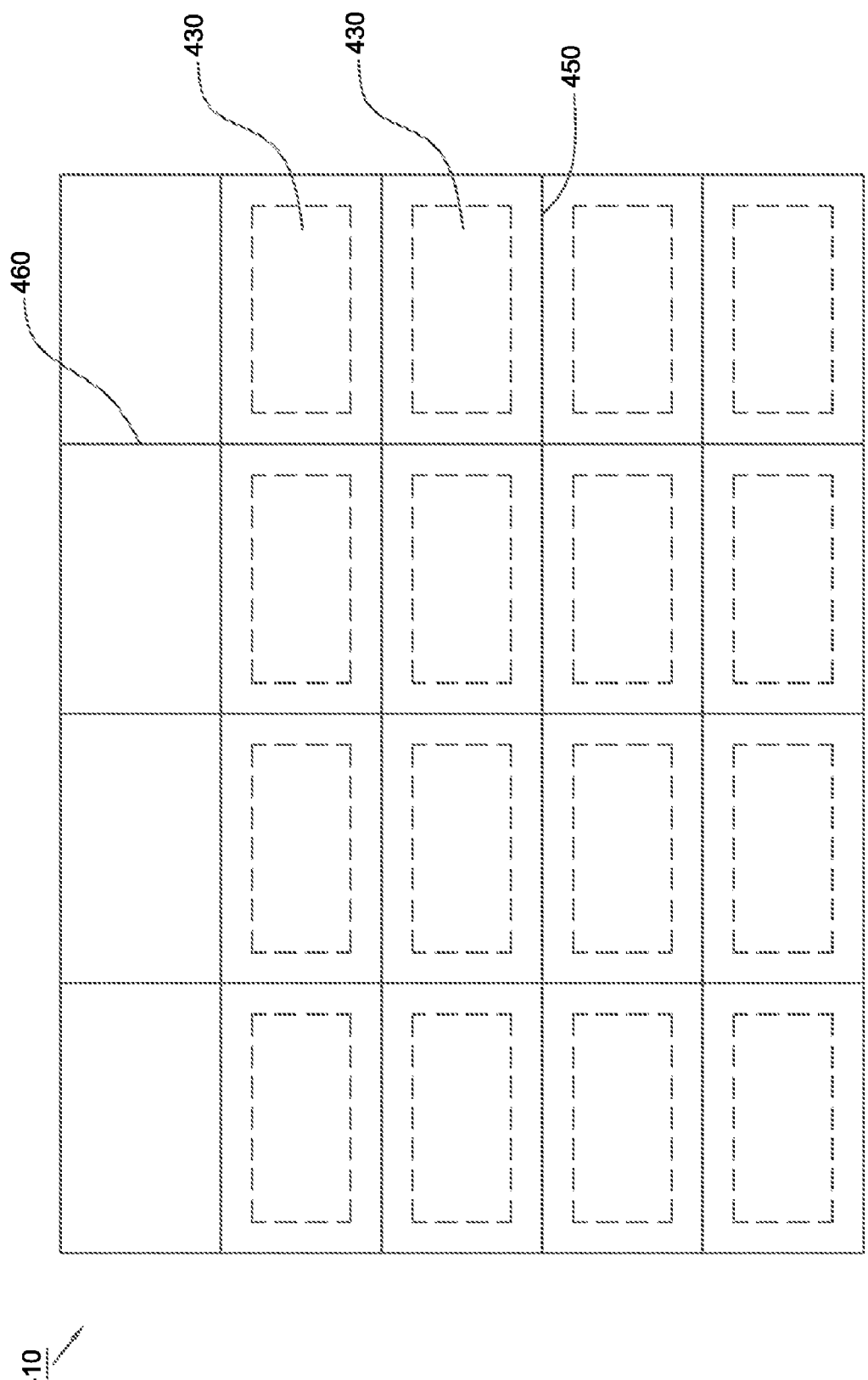

Referring to FIG. 4a, a transflective liquid crystal display 400 according to the first embodiment of the present invention includes an active element array substrate 410, a counter substrate 420 and a liquid crystal layer 440 made of such as positive or negative liquid crystal sandwiched between the substrates 410 and 420. An upper polarizer 574 is disposed above the counter substrate 420 and an upper retardation plate 584 is disposed between the upper polarizer 574 and counter substrate 420. A lower polarizer 572 is disposed under the active element array substrate 410 and a lower retardation plate 582 is disposed between the active element array substrate 410 and the lower polarizer 572. Referring to FIG. 4b, a plurality of scan lines 450 and a plurality of data lines 460 are disposed on the active element array substrate 410 and face the counter substrate 420. The areas between each two adjacent scan lines 450 and each two adjacent data lines 460 are defined as pixel areas 430.

Figure 4C:
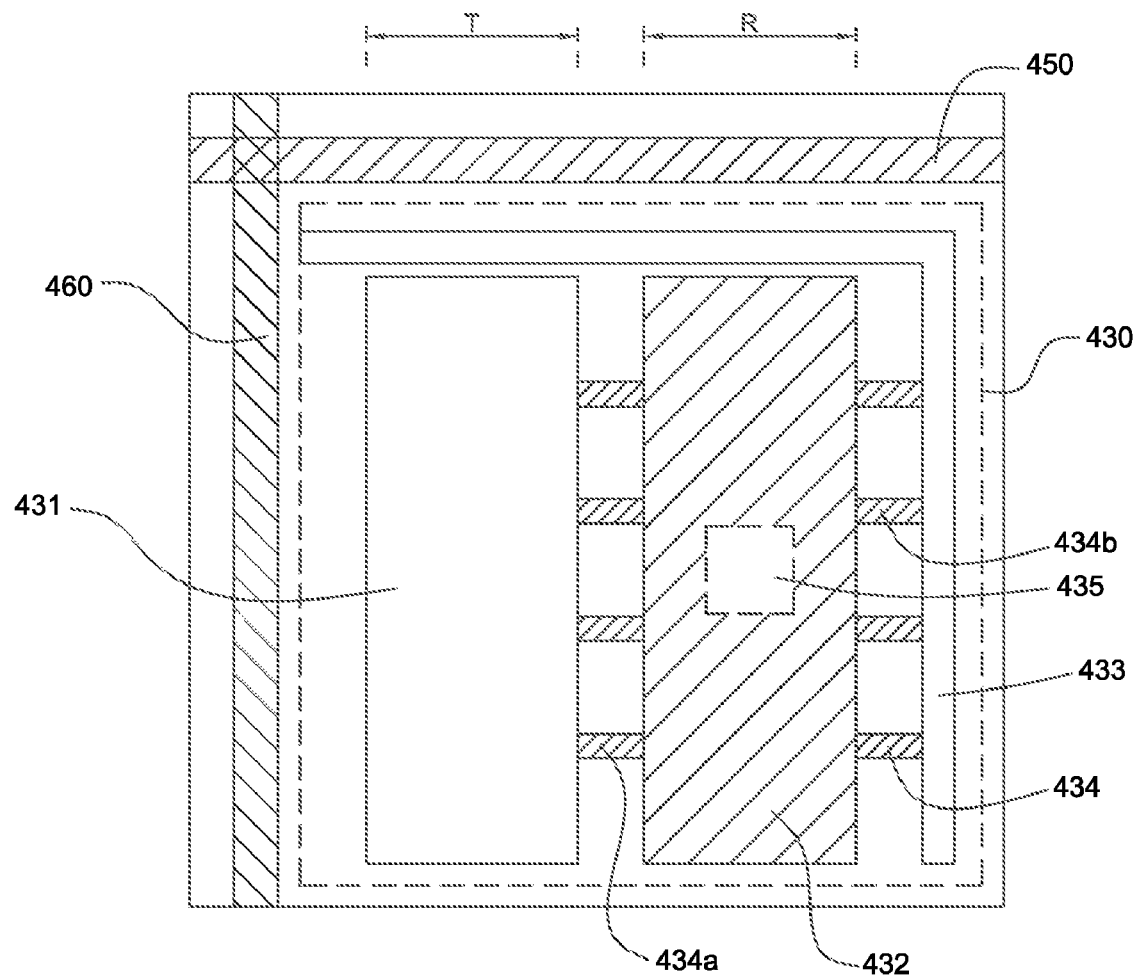
FIG. 4c is an enlarged view of one of the pixel areas shown in FIG. 4b.

Referring FIG. 4c, it illustrates an enlarged view of one of the pixel areas 430. The pixel area 430 is provided with a transmissive electrode 431, a reflector 432, a ground electrode 433, an active element 435, a plurality of resistors 434a and a plurality of resistors 434b thereon. The active element 435 may be a thin film transistor (TFT) or a diode. The resistors 434a and 434b may be made of transparent conductive material or conductive metal material. The area on which the reflector 432 is disposed is defined as a reflective area R. The transmissive electrode 431 is disposed on an area that is not covered by the reflector 432 and such area is defined as a transmissive area T. The transmissive area T and reflective area R are substantially identical in thickness. In order to increase aperture ratio, the active element 435 is preferably disposed under the reflector 432. A common electrode 480 is disposed on the counter substrate 420 and faces the transmissive area T and reflective area R (see FIG. 4a). The transmissive electrode 431 is electrically connected to the reflector 432 by the resistors 434a and the ground electrode 433 is electrically connected to the reflector 432 by the resistors 434b.

The active element 435 disposed on the pixel area 430 is driven by the adjacent scan lines 450 and data lines 460. The transmissive electrode 431 can be controlled by the active element 435. The liquid crystal layer 440 sandwiched between the substrates 410 and 420 is driven by the transmissive electrode 431 and common electrode 480. The electric field of the reflective region R can be adjusted by changing the resistances of the resistors 434a or 434b so that the phase shift of the liquid crystal layer 440 in the reflective region R and transmissive region T can be controlled. Accordingly, the transmissive area T and reflective area R can be substantially identical in thickness and the complex process for manufacturing double cell gap structure is thus not required.

Figure 5:
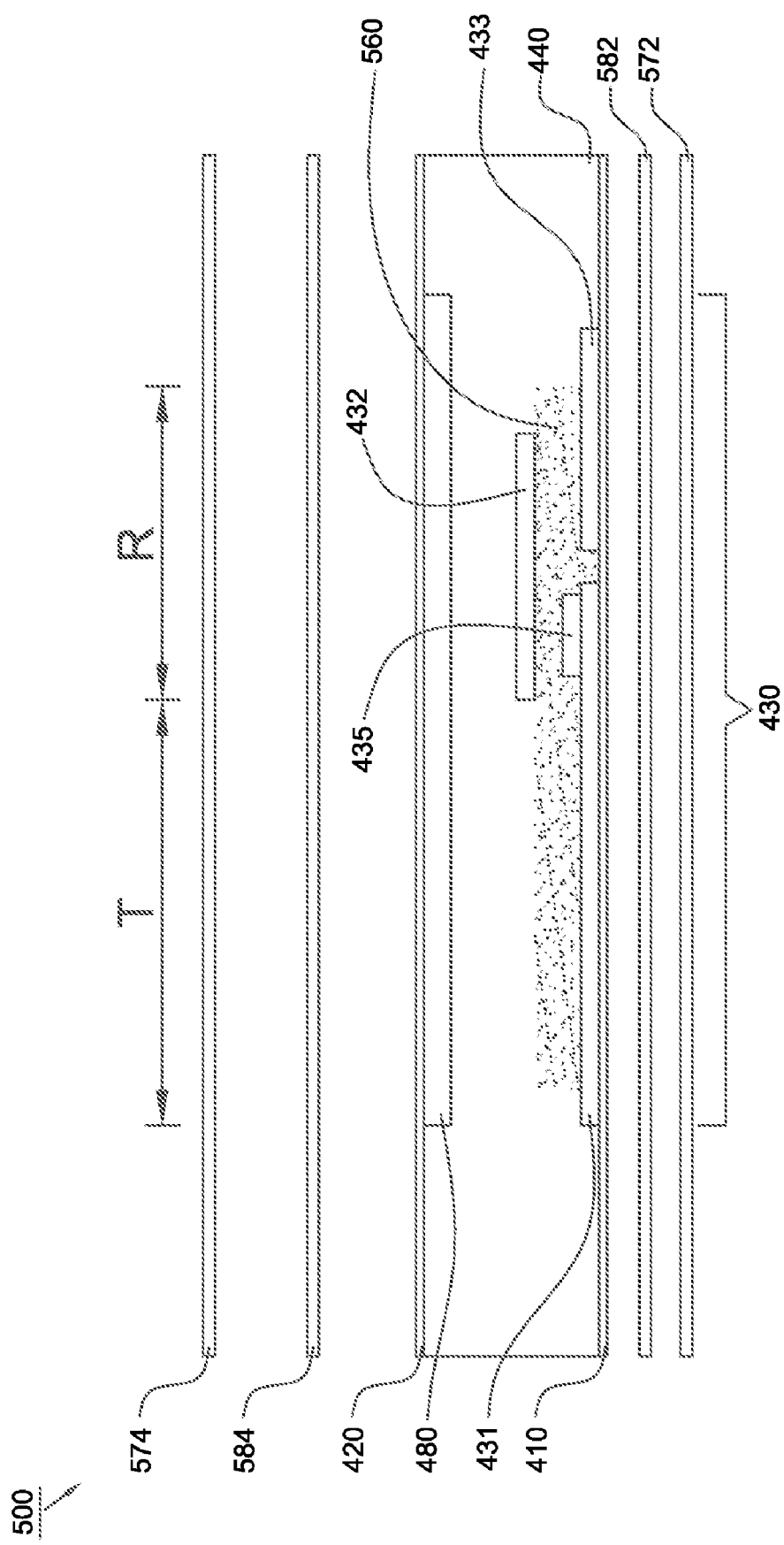
FIG. 5 is a schematic diagram illustrating a transmissive liquid crystal display according to the second embodiment of the present invention.

Referring to FIG. 5, a transflective liquid crystal display 500 according to the second embodiment of the present invention is similar to the display 400 of the present invention, where identical reference numerals have been used when designating substantially identical elements that are common to the figures. Thus, any further illustrations of the identical elements are omitted herein. In comparison with the display 400, the display 500 does not include resistors 434a, 434b. Instead, each of the pixel areas 430 in the display 500 includes an extra isolation layer 560 disposed on the transmissive electrode 431 and ground electrode 433, wherein the reflector 432 floats on the isolation layer 560. That is, the reflector 432 is isolated from the transmissive electrode 431 and ground electrode 433 by isolation layer 560. As a result, since the reflector 432 is extremely thin, the transmissive region T and reflective region R can be deemed to be substantially identical in thickness.

The reflector 432 positioned on the isolation layer 560 has a potential different from that of transmissive electrode 431 as a result of the presence of the isolation layer 560. Therefore, the transmissive region T and reflective region R are different in electric field. The electric field of the reflector 432 is decided based on the proportion of overlap between the reflector 432 and transmissive electrode 431 and on the thickness of the isolation layer 560, and therefore the optimization of the optical structure of the transmissive region T and reflective region R can be achieved by optimizing these parameters. Consequently, it is understood that the transmissive region T and reflective region R can be kept substantially identical in thickness and the complex process for manufacturing double cell gap structure is thus not required.

As shown in the foregoing embodiments, the spirit of the present invention is to attenuate the electric field of the reflective region R to a value equal to only one-half of that of the transmissive region T under a single cell gap structure so that the total phase shift $\Delta n_t d$ of the light propagating through the liquid crystal layer 440 in the transmissive region T is equal to the total phase shift $\Delta n_r d$ of the light propagating through the liquid crystal layer 440 in the reflective region R. As described above, the liquid crystal layer 440 may be made of positive or negative liquid crystal. The various aspects of the present invention will be shown in the following detailed description.

Figure 6A:
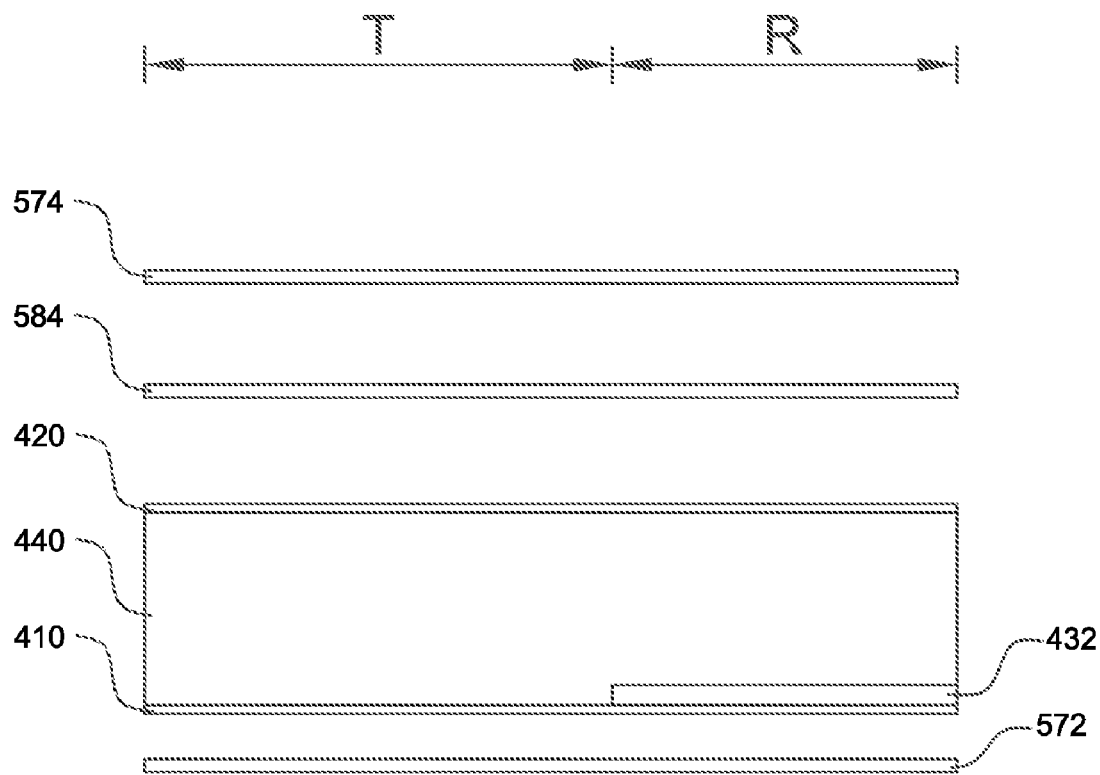
FIG. 6a illustrates an arrangement of optical elements for demonstrating the advantage of the displays of the present invention.

Referring to FIG. 6a, to demonstrate the advantage of the displays 400 and 500 of the present invention, the positive liquid crystal molecules are used to form the liquid crystal layer 440 with positive dielectric anisotropy and there is no use of the lower retardation plate 582. Also, the absorption axes of the lower and upper polarizers 572, 574 are set to be perpendicular to each other and the upper retardation plate 584 has a quarter-wave phase shift, i.e. $\pi/2$ radian phase shift. When there is no voltage applied to the liquid crystal layer 440, the optical axes of the liquid crystal molecules are parallel to the planes of the substrates 410 and 420. Therefore, the liquid crystal layer 440 no matter in the transmissive region T or in the reflective region R possesses the same half-wave phase shift, i.e. $\pi$ radian phase shift. When a $V_{off}$ voltage is applied to the liquid crystal layer 440, the liquid crystal molecules in transmissive region T are rotated a certain angle by electric field. The effective phase shift of the liquid crystal layer 440 in the transmissive region T is therefore reduced to $\pi/2$ radian. In contrast, as a result of the presence of the resistors 434a, 434b in the display 400 or the isolation layer 560 in the display 500, the applied voltage $V_{off}$ is below the threshold voltage of the liquid crystal layer 440 in the reflective region R and therefore the liquid crystal molecules therein are not driven by the voltage $V_{off}$. The effective phase shift of the liquid crystal layer 440 in the reflective region R still remains $\pi$ radian. The variation of polarization of the light passing through the liquid crystal layer 440 will be shown in the following description.

Figure 6B:
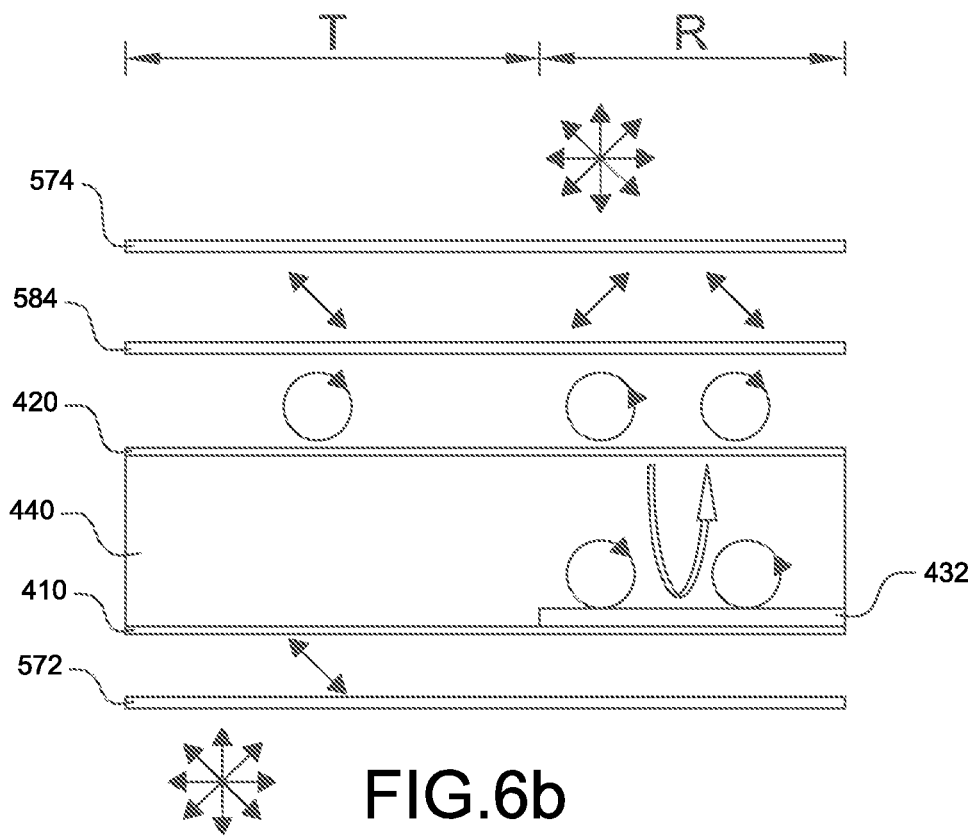
FIG. 6b illustrates the variation of polarization of the light passing through the optical elements in the transmissive and reflective regions of the display in FIG. 6a when a $V_{off}$ voltage is applied to the liquid crystal layer.

Referring to FIG. 6b, unpolarized light from a backlight (not shown) passes through the lower polarizer 572 to be transformed into a linearly polarized light with polarization perpendicular to the absorption axis of the lower polarizer 572. Since the voltage $V_{off}$ is applied to the liquid crystal layer 440 and therefore the effective phase shift of the liquid crystal layer 440 in the transmissive region T is $\pi/2$ radian as described above, the linearly polarized light will be transformed into a right-hand circularly polarized light after passing through the liquid crystal layer 440 in the transmissive region T. When the right-hand circularly polarized light propagates past the upper retardation plate 584, it is transformed into a linearly polarized light with polarization parallel to the absorption axis of the upper polarizer 574. Consequently, the linearly polarized light fails to pass through the upper polarizer 574 and then the transmissive region T is dark.

The unpolarized ambient light passes through the upper polarizer 574 to be transformed into a linearly polarized light with polarization perpendicular to the absorption axis of the upper polarizer 574. When the linearly polarized light propagates past the upper retardation plate 584, it is transformed into a left-hand circularly polarized light. Since the effective phase shift of the liquid crystal layer 440 in the reflective region R is still $\pi$ radian as explained above, the left-hand circularly polarized light will be transformed into a right-hand circularly polarized light after passing through the liquid crystal layer 440 in the reflective region R. The right-hand circularly polarized light will experience a $\pi$ radian phase shift when reflected by the reflector 432 and therefore it is transformed into a left-hand circularly polarized light. After passing through the liquid crystal layer 440 in the reflective region R once again, the left-hand circularly polarized light is transformed into a right-hand circularly polarized light. The right-hand circularly polarized light will be transformed into a linearly polarized light with polarization parallel to the absorption axis of the upper polarizer 574 when it propagates past the upper retardation plate 584 once again. Consequently, the linearly polarized light fails to pass through the upper polarizer 574 and then the reflective region R is dark.

When a $V_{on}$ voltage is applied to the liquid crystal layer 440, the optical axes of the liquid crystal molecules in transmissive region T are rotated to be perpendicular to the planes of the substrates 410 and 420 by electric field. Therefore, the effective phase shift of the liquid crystal layer 440 in the transmissive region T is zero. In contrast, as a result of the presence of the resistors 434a, 434b in the display 400 or the isolation layer 560 in the display 500, the voltage applied to the liquid crystal layer 440 in the reflective region R is equal to one-half of that applied to the liquid crystal layer 440 in the transmissive region T. Consequently, the liquid crystal molecules in reflective region R are rotated to a certain angle and the effective phase shift of liquid crystal layer 440 in the reflective region R is equal to $\pi/2$ radian.

Figure 6C:
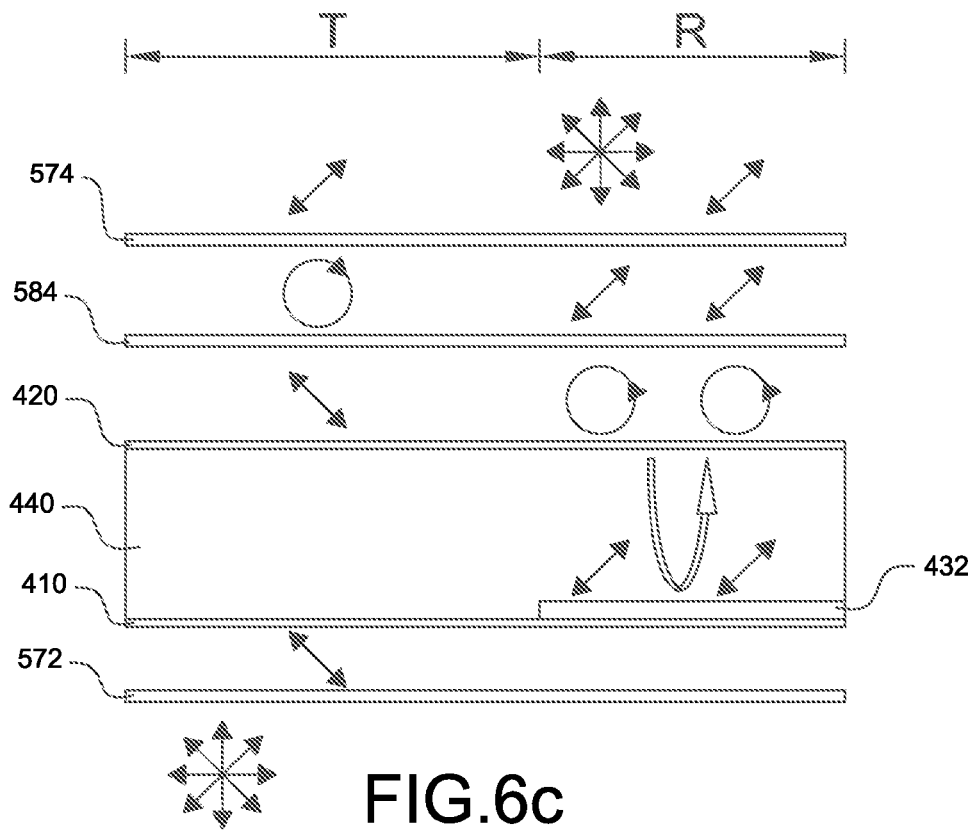
FIG. 6c illustrates the variation of polarization of the light passing through the optical elements in the transmissive and reflective regions of the display in FIG. 6a when a $V_{on}$ voltage is applied to the liquid crystal layer.

Referring to FIG. 6c, the linearly polarized light emanating from the lower polarizer 572 still keeps its polarization state after passing through the liquid crystal layer 440 in the transmissive layer T. This is because the effective phase shift of the liquid crystal layer 440 in the transmissive region T is equal to zero as explained above. When the linearly polarized light propagates past the upper retardation plate 584 of $\pi/2$ radian phase shift, it is transformed into a right-hand circularly polarized light. Since the right-hand circularly polarized light has a component whose polarization is perpendicular to the absorption axis of the upper polarizer 574 and is therefore able to pass through the upper polarizer 574, the transmissive region T will exhibit bright.

The linearly polarized light emanating from the upper polarizer 574 will be transformed into a left-hand circularly polarized light when it propagates past the upper retardation plate 584. Since the effective phase shift of the liquid crystal layer 440 in the reflective region R is $\pi/2$ radian, the left-hand circularly polarized light will be transformed into a linearly polarized light with polarization perpendicular to the absorption axis of the upper polarizer 574 after passing through the liquid crystal layer 440 in the reflective region R. The linearly polarized light will still keep its polarization state after being reflected by the reflector 432. After passing through the liquid crystal layer 440 in the reflective region R once again, the linearly polarized light is transformed into a left-hand circularly polarized light. The left-hand circularly polarized light will be transformed into a linearly polarized light with polarization perpendicular to the absorption axis of the upper polarizer 574 when it propagates past the upper retardation plate 584 once again. Consequently, the linearly polarized light is able to pass through the upper polarizer 574 and then the reflective region R is bright.

Figure 7A:
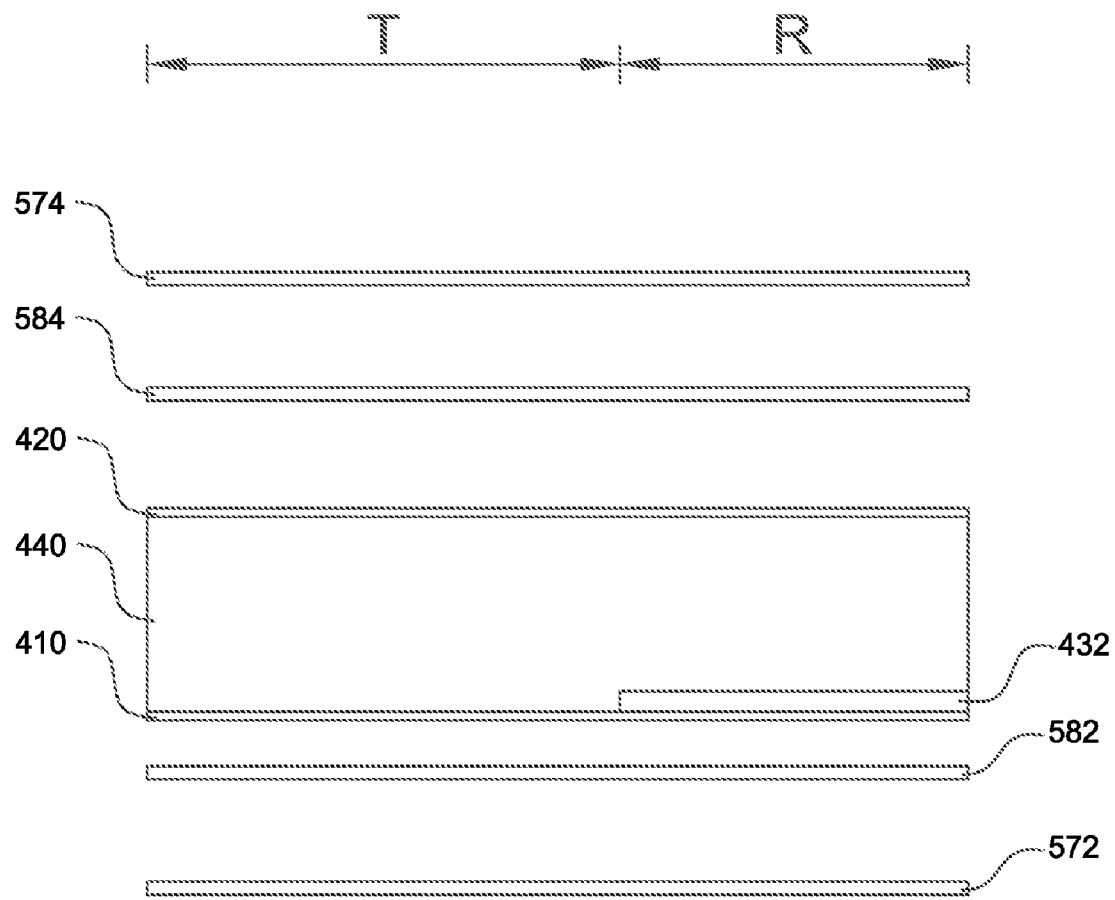
FIG. 7a illustrates another arrangement of optical elements for demonstrating the advantage of the displays of the present invention.

Referring to FIG. 7a, it illustrates another optical structure for the displays 400 and 500 of the present invention to demonstrate the advantage thereof. The negative liquid crystal molecules are used to form the liquid crystal layer 440 and the absorption axes of the lower and upper polarizers 572, 574 are set to be perpendicular to each other. Also, both of the lower and upper retardation plates 582, 584 have a quarter-wave phase shift, i.e. $\pi/2$ radian phase shift. When there is no voltage applied to the liquid crystal layer 440, the optical axes of the liquid crystal molecules are perpendicular to the planes of the substrate 410 and 420. Therefore, the liquid crystal layer 440 no matter in the transmissive region T or in the reflective region R possesses zero phase shift. When the $V_{off}$ voltage which is below the threshold voltage of the liquid crystal layer 440 is applied to the liquid crystal layer 440, the liquid crystal molecules in the transmissive region T and reflective region R are not driven by the voltage $V_{off}$. The effective phase shift of the liquid crystal layer 440 still remains zero.

Figure 7B:
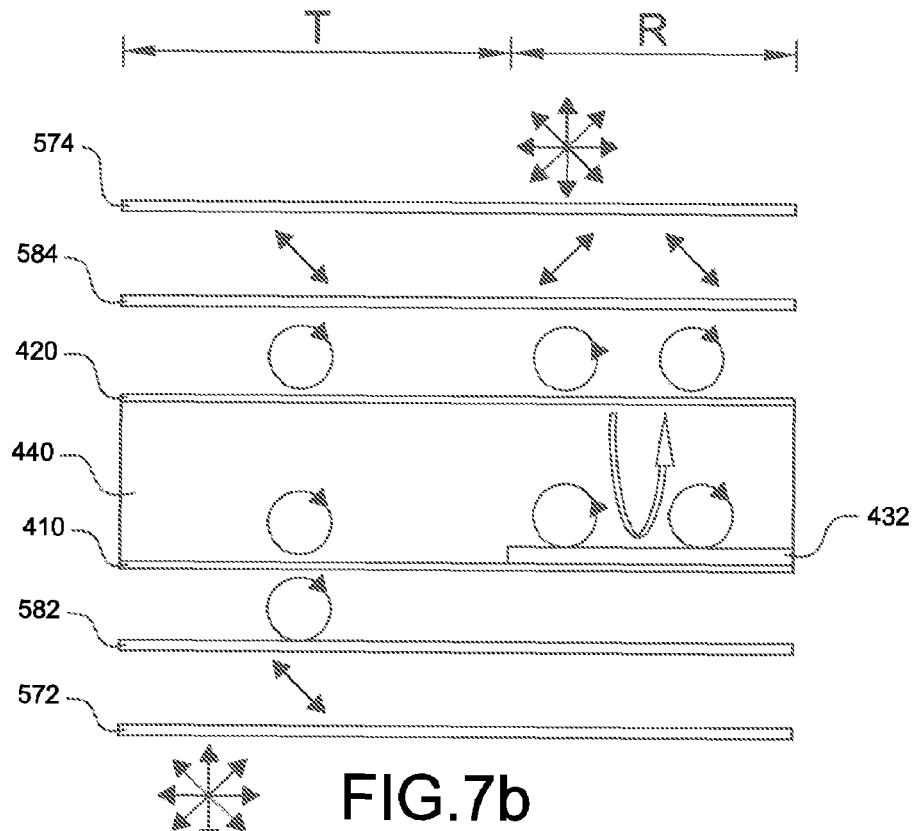
FIG. 7b illustrates the variation of polarization of the light passing through the optical elements in the transmissive and reflective regions of the display in FIG. 7a when a $V_{off}$ voltage is applied to the liquid crystal layer.

Referring to FIG. 7b, it illustrates the variation of polarization of the light before and after passing through the liquid crystal layer 440 in the transmissive region T and reflective region R. As shown in the figure, when the $V_{off}$ voltage is applied to the liquid crystal layer 440, both of the transmissive and reflective regions T and R exhibit dark.

Figure 7C:
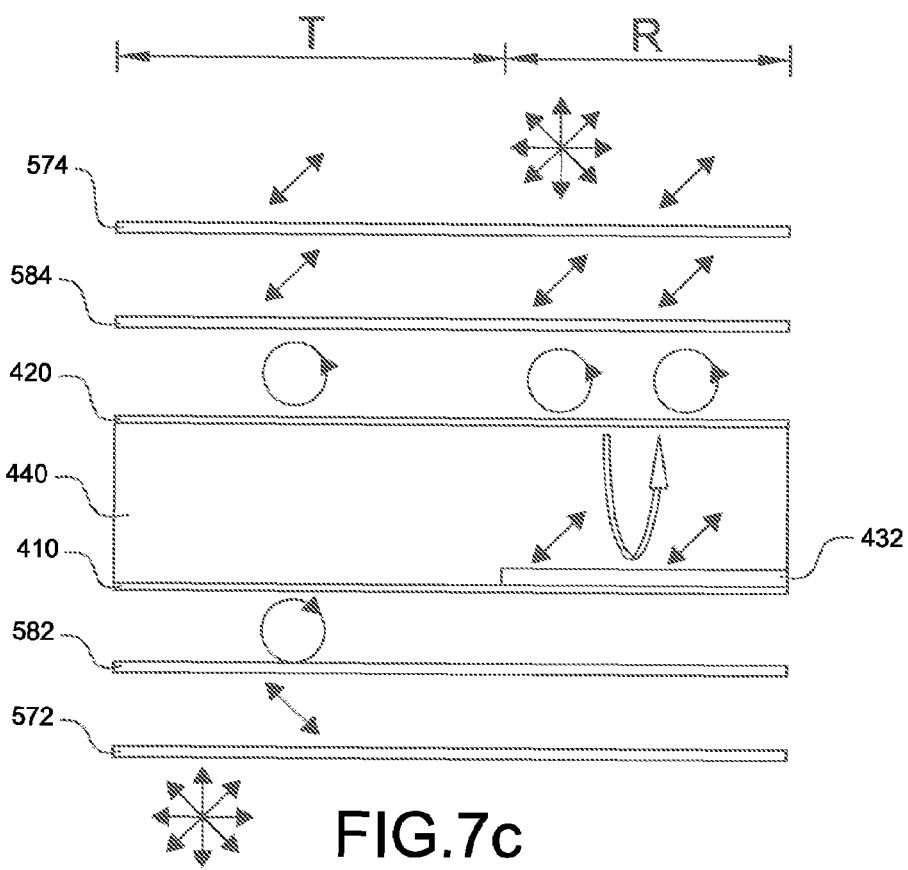
FIG. 7c illustrates the variation of polarization of the light passing through the optical elements in the transmissive and reflective regions of the display in FIG. 7a when a $V_{on}$ voltage is applied to the liquid crystal layer.

When the $V_{on}$ voltage is applied to the liquid crystal layer 440, the optical axes of the liquid crystal molecules in transmissive region T are rotated to be parallel to the planes of the substrates 410 and 420 by electric field. Therefore, the effective phase shift of the liquid crystal layer 440 in the transmissive region T is equal to $\pi$ radian. In contrast, as a result of the presence of the resistors 434a, 434b in the display 400 or the isolation layer 560 in the display 500, the voltage applied to the liquid crystal layer 440 in the reflective region R is equal to one-half of that applied to the liquid crystal layer 440 in the transmissive region T. Consequently, the liquid crystal molecules in reflective region R are rotated to a certain angle and the effective phase shift of liquid crystal layer 440 in the reflective region R is equal to $\pi/2$ radian. Referring to FIG. 7c, it illustrates the variation of polarization of the light before and after passing through the liquid crystal layer 440 in the transmissive region T and reflective region R. As shown in the figure, when the $V_{on}$ voltage is applied to the liquid crystal layer 440, both of the transmissive and reflective regions T and R exhibit bright.

Although the preferred embodiments of the invention have been disclosed for illustrative purposes, those skilled in the art will appreciate that various modifications, additions and substitutions are possible, without departing from the scope and spirit of the invention as disclosed in the accompanying claims.

What is claimed is:

1. A transmissive liquid crystal display, comprising:
    a lower substrate defining a plurality of pixel areas thereon, each of the pixel areas comprising a transmissive electrode, at least one first resistor, a reflector and a ground electrode, wherein the ground electrode is electrically connected to the reflector and the transmissive electrode is electrically connected to the reflector by the first resistor;
    an upper substrate disposed above the lower substrate, the upper substrate provided with a plurality of common electrodes facing the pixel areas;
    a liquid crystal layer sandwiched between the upper and lower substrates;
    an upper polarizer disposed above the upper substrate; and
    a lower polarizer disposed under the lower substrate.

2. The transmissive liquid crystal display as claimed in claim 1, wherein each of the pixel areas further comprises at least one second resistor electrically connecting the ground electrode to the reflector.

3. The transmissive liquid crystal display as claimed in claim 1, further comprising:
    an upper retardation plate disposed between the upper polarizer and upper substrate.

4. The transmissive liquid crystal display as claimed in claim 1, wherein the area on which the reflector is disposed is defined as a reflective area, the remaining portion of the pixel area that is not covered by the reflector is defined as a transmissive area, the transmissive area and reflective area are substantially identical in thickness.

5. The transmissive liquid crystal display as claimed in claim 1, wherein each of the pixel areas further comprises an active element disposed thereon.

6. The transmissive liquid crystal display as claimed in claim 5, wherein the active element is an element selected from the group consisting of a thin film transistor and a diode.

7. The transmissive liquid crystal display as claimed in claim 5, wherein the active element is disposed under the reflector.

8. The transmissive liquid crystal display as claimed in claim 1, wherein the liquid crystal layer is made of a material selected from the group consisting of positive liquid crystal with positive dielectric anisotropy and negative liquid crystal with negative dielectric anisotropy.

9. The transmissive liquid crystal display as claimed in claim 2, wherein the first and second resistors are made of a material selected from the group consisting of transparent conductive material and conductive metal material.

10. The transmissive liquid crystal display as claimed in claim 3, further comprising:
    a lower retardation plate disposed between the lower polarizer and lower substrate.

11. A transmissive liquid crystal display, comprising:
    a lower substrate defining a plurality of pixel areas thereon, each of the pixel areas comprising a transmissive electrode, a isolation layer, a reflector and a ground electrode, wherein the isolation layer is disposed on the transmissive electrode and ground electrode, the reflector floats on the isolation layer and is isolated from the transmissive electrode;
    an upper substrate disposed above the lower substrate, the upper substrate provided with a plurality of common electrodes facing the pixel areas;
    a liquid crystal layer sandwiched between the upper and lower substrates;
    an upper polarizer disposed above the upper substrate; and
    a lower polarizer disposed under the lower substrate.

12. The transmissive liquid crystal display as claimed in claim 11, further comprising:
    an upper retardation plate disposed between the upper polarizer and upper substrate.

13. The transmissive liquid crystal display as claimed in claim 11, wherein each of the pixel areas further comprises an active element disposed thereon.

14. The transmissive liquid crystal display as claimed in claim 13, wherein the active element is an element selected from the group consisting of a thin film transistor and a diode.

15. The transmissive liquid crystal display as claimed in claim 11, wherein the area on which the reflector is disposed is defined as a reflective area, the remaining portion of the pixel area that is not covered by the reflector is defined as a transmissive area, the transmissive area and reflective area are substantially identical in thickness.

16. The transmissive liquid crystal display as claimed in claim 13, wherein the active element is disposed under the reflector.

17. The transmissive liquid crystal display as claimed in claim 11, wherein the liquid crystal layer is made of a material selected from the group consisting of positive liquid crystal with positive dielectric anisotropy and negative liquid crystal with negative dielectric anisotropy.

18. The transmissive liquid crystal display as claimed in claim 12, further comprising:
    a lower retardation plate disposed between the lower polarizer and lower substrate.

19. The transmissive liquid crystal display as claimed in claim 11, wherein the reflector is isolated from the ground electrode by the isolation layer.

* * * * *